UNITED STATES PATENT OFFICE.

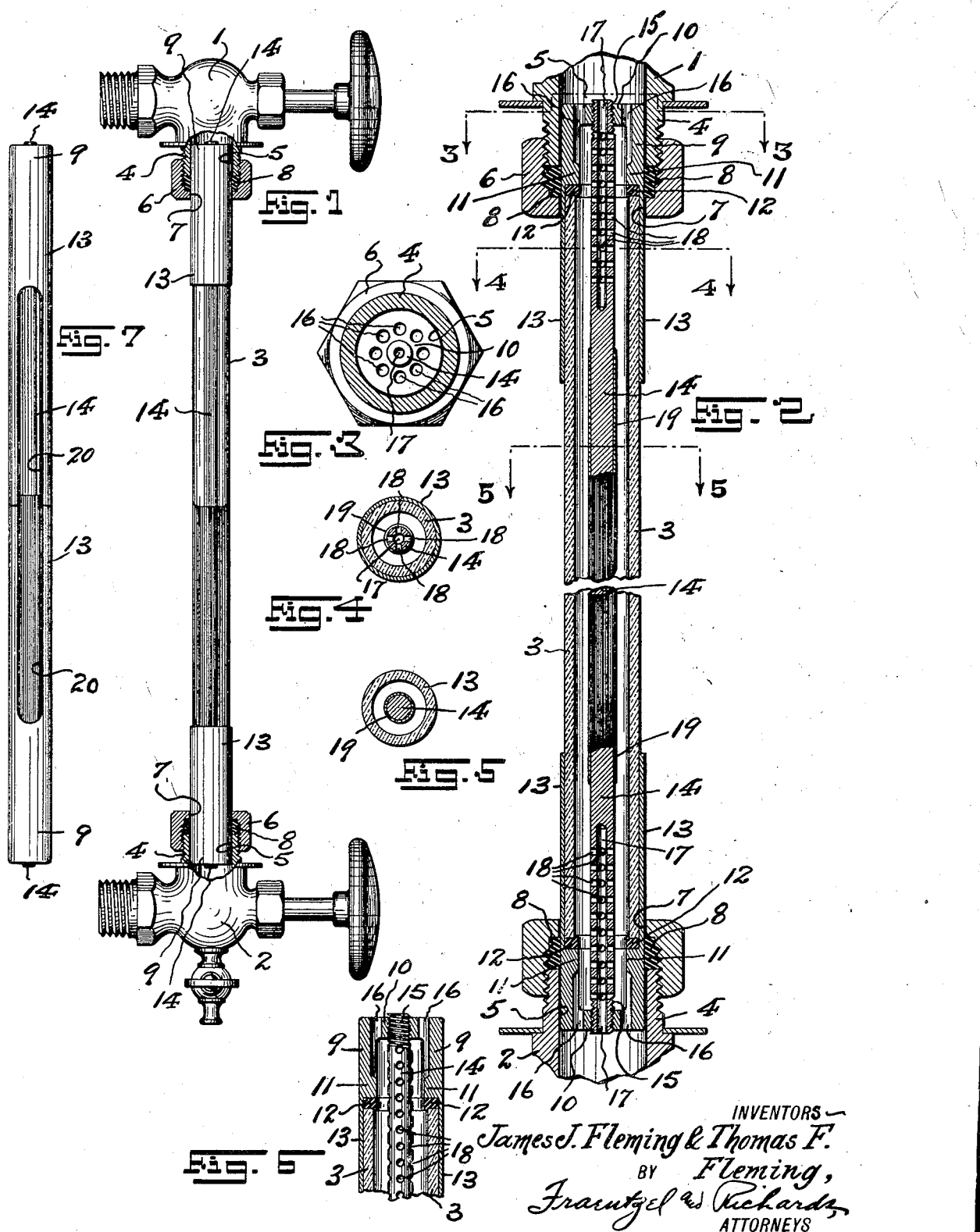

JAMES J. FLEMING AND THOMAS F. FLEMING, OF NEWARK, NEW JERSEY.

WATER-GAGE-GLASS DEVICE.

1,335,570.  Specification of Letters Patent.  Patented Mar. 30, 1920.

Application filed February 17, 1919. Serial No. 277,424.

*To all whom it may concern:*

Be it known that we, JAMES J. FLEMING and THOMAS F. FLEMING, citizens of the United States, residing at Newark, in the county of Essex and State of New Jersey, have invented certain new and useful Improvements in Water-Gage-Glass Devices; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally to improvements in the construction of water gages for steam boilers and the like; and the invention has reference, more particularly, to a novel construction of water gage glass provided with means for preventing the bursting of the gage glass under sudden exterior temperature changes.

The invention has for its principal object to provide a novel construction of water gage glass comprising the usual transparent tubular body with which is combined a novel means for radiating heat from the interior thereof, and at the same time equalizing the temperature of the interior and exterior surface portions of the glass body, to render the same less likely to break or fracture by reason of sudden stresses caused by unequal expansion or contraction of said relative portions of the glass body under sudden changes of exterior temperature conditions.

Another object of the invention is to provide a novel telltale means for rendering more clearly visible the water level within the gage glass.

Other objects of the present invention, not at this time more particularly enumerated, will be clearly understood from the following detailed description of the same.

With the various objects of the present invention in view, the same consists, primarily, in the novel construction of water gage for steam boilers, and the like, hereinafter set forth; and, the invention consists, furthermore, in the several novel arrangements and combinations of the various devices and parts, as well as in the details of the construction of the same, all of which will be more fully described in the following specification, and then finally embodied in the claims appended thereto.

The invention is clearly illustrated in the accompanying drawings, in which:—

Figure 1 is a side elevation of the novel construction of water gage, made according to and embodying the principles of the present invention, mounted in its supporting fittings, portions of the latter being broken away and shown in section to disclose the seating of the ends of the water gage therein.

Fig. 2 is a detail longitudinal vertical section of the novel construction of water gage, as seated in the supporting fittings, the same being drawn on an enlarged scale.

Fig. 3 is a transverse section taken on line 3—3 in said Fig. 2; Fig. 4 is another transverse section taken on line 4—4 in said Fig. 2; and Fig. 5 is still another transverse section taken of line 5—5 in said Fig. 2.

Fig. 6 is a detail vertical longitudinal section of one end of the water gage device, but showing the central radiator rod in elevation.

Fig. 7 is a side elevation of the water gage with its end ferrules modified in form to provide a cage guard about the glass body of the gage device.

Similar characters of reference are employed in all of the hereinabove described views, to indicate corresponding parts.

Referring now to said drawing, the reference character 1 indicates an upper fitting or socket member for connection in communication with a steam boiler, or the like (not shown), and the reference character 2 indicates a lower fitting or socket member for like connection in communication with said steam boiler. The novel gage glass device, to be subsequently described in detail, is supported by its respective ends in said respective fittings or socket members 1 and 2, so as to extend vertically therebetween.

Each socket member or fitting 1 and 2 is provided with an exteriorly threaded stuffing-box neck 4, having a cylindrical opening 5 for the reception of the ends of the gage glass device. An internally threaded stuffing-box cap or nut 6, having a central opening 7 in the body thereof, to permit an end of the gage glass device to extend therethrough, screws upon each stuffing-box neck 4, to hold under expanded pressure and in tightly embracing relation to the end of the gage glass device a suitable packing 8, adapted to form a leak tight joint between the said socket members or fittings and the respective ends of the gage glass device inserted therein.

The gage glass device comprises the usual tubular body 3 of transparent glass. The reference character 9 indicates a metallic ferrule or end member having an end wall 10 closing its outer end. Arranged within said ferrule or end member 9 is an internal annular shoulder 11, upon which is seated a packing washer 12. Extending beyond said annular shoulder 11 is the tubular skirt 13 adapted to be telescopically engaged over an end of said gage glass or tube 3, embracing the latter, and in contact with the exterior surface thereof. One of said ferrules or end members 9 is fitted telescopically over each end of said gage glass or tube 3, and pushed down thereon until the packing washers 12 are engaged with the respective extremities thereof. The reference character 14 indicates a metallic radiator member or rod which is passed centrally and longitudinally through the interior of the gage glass or tube 3. Said radiator member or rod is provided at its respective ends with exterior left handed screw threads 15 which respectively screw into properly internally threaded central openings provided in the end walls 10 of said ferrules or end members. By turning or screwing said ferrules or end members down upon the ends of the radiator member or rod, the same are respectively drawn down on the ends of the gage glass 3 to tightly squeeze said packing washers 12 against the extremities of the gage glass or tube, thereby providing a leak tight joint between the respective ferrules or end members and the respective ends of the gage glass or tube, and at the same time properly coupling the said radiator member or rod with the respective ferrules or end members.

In order to provide the necessary means of communication between the interior of the gage glass or tube 3 and the boiler, by way of the socket members or fittings 1 and 2, the end wall of each ferrule or end member is provided with a plurality of perforations or passages 16, and in addition thereto each end of the radiator member or rod may be also provided with an inwardly extending vertical passage or duct 17 from which radiate outwardly, through its side walls, a plurality of lateral perforations or passages 18 communicating with the interior of said gage glass or tube 3, thus providing ready access of water from the boiler to and through the lower end of the gage glass or tube, and access of air or steam to and through the upper end of the gage glass or tube, in the usual manner.

The intermediate portion of the radiator member or rod, where the same is visible through the exposed portion of the gage glass or tube 3, is provided with a coating 19, of water and heat proof pigment of a suitable color, preferably red. When the water enters the gage glass or tube 3, that portion of the radiator member or rod which is surrounded by the water reflects its color through the water, and the radiator member or rod being magnified when viewed through the glass and water, the water and that part of the gage glass in which the water is located, partake of the color of the radiator member or rod, so that the coloring thus reflected and imparted clearly discloses the line of demarcation denoting the level of the water in the gage glass, thus providing a telltale of very pronounced visibility.

It is well known that an ordinary gage glass comprising merely a length of glass tubing mounted between the supporting fittings, is very likely to burst or fracture when a sudden draft of cold air, or any cold water, comes in contact with its outer surface. This liability to fracture is largely due to the fact that glass is a very poor conductor of heat, and consequently when hot water enters the same, the inside surface portions are maintained at a considerably higher temperature than the outside surface portions by reason of the poor conductivity of the glass, and because the same is usually separated from any contact with the metal fittings by the packing rings. Consequently when cold air or water strikes the outer surface the glass, such surface and adjacent portions of the glass body being already at a lower temperature than the inner surface portions, the same is more easily subject to a quick contraction, that is, the outer portions of the glass contract much more rapidly than the inner portions which are at a higher temperature, therefore an unequal internal stress is placed upon the glass body resulting, in the majority of cases, in the bursting of the glass, or at least in a fracture of the same rendering it useless. Under these circumstances not only does it occur that frequent and costly replacement of the glass tubes becomes necessary, but the danger of being hit and injured by flying glass particles is always present.

It is the primary object of our present invention to overcome the above stated difficulties, and provide a gage glass device which is free from the liability to sudden breakage from the above stated causes. To this end we provide a gage glass member with the novel means for radiating and distributing the internal heat, so as to both reduce and equalize the temperature of the glass throughout its mass. When the hot water enters our glass it surrounds the metallic radiator member or rod, which being a better and faster conductor of heat, absorbs and conveys the heat to the ferrules or end members, the skirts of which convey the heat to the exterior surface of the glass body, thereby raising the temperature thereof to a nearer equality with the temperature of the inner portions of the glass, with the tendency to thus equalize the temperature throughout the body of the glass. Since the skirts of the furrules or end members are of a substantial length, they project beyond the fittings 1 and 2 into the open air, and also serve to radiate some heat away, whereby the temperature of the interior of the glass is reduced. As a consequence of the novel arrangement of the heat distributing and radiating means in combination with the glass tube 3, the latter is maintained in a condition of comparatively equalized temperature throughout its mass or body so that variations of external temperature cannot suddenly produce stresses in the glass beyond the power of its resistance.

Another advantage our novel construction of gage glass affords, is that necessity for fusing the ends of the glass tube or body to close the pores thereof is avoided, since the ends of our glass tube 3 are sealed and protected by the packing washers 12. This is an advantage, since in fusing the ends of the glass tubes, they are usually weakened by reason of the annealing effect of the fusing process.

When using ordinary glass gages, the glass tubes must be of proper length, and consequently short lengths of tubes, left over after cuttings, are wasted. With our construction short lengths of the glass tubes may be employed, the shortage being made up in the ferrules or end members by a compensating location of the shoulder 11, or by using additional packing washers 12. Furthermore, in our construction of glass, the outside diameter of the ferrules or end members will always properly correspond to the fittings, even though there be slight variations in the diameters of the glass tubes employed.

Referring now to Fig. 7 of the drawings, we have shown therein a modification of the end ferrules 9, which consists in lengthening the skirts 13 thereof until they meet intermediate the ends of the glass tube 3, and then cutting the slot 20 in said skirts to expose the glass 3 to sight. This arrangement provides in addition to the novel heat distributing and radiating functions above mentioned, a protecting envelop or cage guard about the glass tube 3, thereby inclosing the same and guarding the same against breakage by accidental blows.

We are aware that some changes may be made in the several arrangements and combinations of the parts of our novel water gage device as well as in the details of the construction thereof, without departing from the scope of the invention as above described, and as defined in the appended claims. Hence, we do not limit our invention to the exact arrangements and combinations of the said devices and parts as hereinabove described, nor do we confine ourselves to the exact details of the construction of said parts as illustrated in the accompanying drawings.

We claim:—

1. A water gage device comprising a tubular glass body, metallic end ferrules telescopically engaged over the ends of said glass body, a radiator member extending longitudinally through the interior of said glass body and having its respective ends engaged with said respective end ferrules, said end ferrules having passages providing means of communication with the interior of said glass body, and means providing a leak tight joint between said end ferrules and the ends of said glass body.

2. A water gage device comprising a tubular glass body, metallic end ferrules having a closing wall at their outer ends and a tubular skirt portion at their inner ends, said tubular skirt portions being adapted to be telescopically fitted over the ends of said glass body, a metallic radiator member extending longitudinally through the interior of said glass body and having its respective ends arranged in left hand threaded engagement with said respective end walls of said end ferrules, said end walls of said ferrules having a plurality of openings therethrough providing means of communication with interior of said glass body, and means providing a leak tight joint between said end ferrules and the ends of said glass body.

3. A water gage device comprising a tubular glass body, metallic end ferrules telescopically engaged over the ends of said glass body, each end ferrule having an internal annular shoulder, packing washers seated upon said shoulders for sealing engagement with the extremities of said glass body, a radiator member extending longitudinally through the interior of said glass body and having its ends engaged with said respective end ferrules, and said end ferrules having passages providing means of communication with the interior of said glass body.

4. A water gage device comprising a tubular glass body, metallic end ferrules having outer end walls telescopically engaged over the ends of said glass body, each end ferrule having an internal annular shoulder, packing washers seated upon said shoulders for sealing engagement with the extremities of said glass body, a metallic radiator rod extending longitudinally and centrally through the interior of said glass body, said radiator rod having its respective ends arranged in left hand threaded engagement with the end walls of said respective ferrules, said end walls of said ferrules having a plurality of openings therethrough providing means of communication with the interior of said glass body, and said radiator rod having longitudinal passages extending into its ends and a plurality of lateral openings extending therefrom into communication with the interior of said glass body.

In testimony that we claim the invention set forth above we have hereunto set our hands this 15th day of February, 1919.

JAMES J. FLEMING.
THOMAS F. FLEMING.

Witnesses:
GEORGE D. RICHARDS,
HEDWIG M. BREMER.